(12) United States Patent
McGivern (10) Patent No.: US 6,382,131 B1
(45) Date of Patent: May 7, 2002

(54) DISPOSABLE KITTY LITTER BOX

(76) Inventor: Sean McGivern, 1231 Randle St., Edwardsville, IL (US) 62025

(*) Notice: Subject to any disclaimer, the term of this patent is extended or adjusted under 35 U.S.C. 154(b) by 0 days.

(21) Appl. No.: 09/694,652

(22) Filed: Oct. 23, 2000

Related U.S. Application Data (63) Continuation-in-part of application No. 09/461,790, filed on Dec. 15, 1999, now abandoned.

(51) Int. Cl.[7] .............................................. A01K 29/00
(52) U.S. Cl. ...................................... 119/165; 119/168
(58) Field of Search ................................ 119/168, 165; 229/101, 144, 186, 117.14

(56) References Cited

U.S. PATENT DOCUMENTS

| | | |
|---|---|---|
| 1,718,872 A | 6/1929 | Ortiz |
| 2,145,682 A | 1/1939 | Bergstein |
| 2,268,906 A | 1/1942 | Scheer |
| 2,842,303 A | 7/1958 | Platt |
| 3,118,590 A | 1/1964 | Kersh et al. |
| 3,154,052 A | 10/1964 | Sweeney |
| 3,743,170 A | 7/1973 | Riccio |
| 4,136,816 A | 1/1979 | Gardner |
| 4,779,567 A | 10/1988 | Smith |
| 4,791,883 A | 12/1988 | Lehman et al. |
| 4,795,085 A | 1/1989 | Wein |
| 4,807,563 A | 2/1989 | Berry et al. |
| 4,890,576 A | 1/1990 | James |
| 4,979,669 A | 12/1990 | Kerton |
| 5,123,381 A | 6/1992 | Salmon |
| 5,144,914 A | 9/1992 | Giannakopoulos |
| 5,251,573 A | 10/1993 | Bremley |
| 5,615,639 A | 4/1997 | Knight |
| 5,655,479 A | 8/1997 | Armington et al. |

*Primary Examiner*—Peter M. Poon
*Assistant Examiner*—Son T. Nguyen
(74) *Attorney, Agent, or Firm*—Polster, Lieder, Woodruff & Lucchesi,L.C.

(57) ABSTRACT

A kitty litter box is made from a unitary, one-piece blank is provided. The kitty litter box includes a first section, a second section, and an intermediate section which are hingedly connected together to be movable between a closed position and an opened position. The dimensions of the closed box are such that the closed kitty litter box can be stood upright on store shelves, allowing the stores to make for efficient use of shelf space. Handles are formed in the end walls of the kitty litter box which are movable between a first position in which the handles are coplanar with the end walls and a second position in which the handles are out of the plane of the end walls to facilitate carrying of the box. The handles include spaced apart legs and a cross-member extending between the legs. The handles define tabs on the end walls between the legs, and, when the handles extend up from the end walls, channels are formed in the end walls adjacent side edges of the tabs. When the kitty litter box is in the closed position, the handles and the end walls of the first and second sections frictionally engage each other to facilitate holding the kitty litter box closed. Thus, the box need not be taped or wrapped to be maintained closed. Also disclosed are box blanks which allow for a formed box to be shipped in a substantially flat state and for a box to be formed without a gluing operation.

21 Claims, 8 Drawing Sheets

DISPOSABLE KITTY LITTER BOX

CROSS-REFERENCE TO RELATED APPLICATIONS

This application is a continuation-in-part of application Ser. No. 09/461,790, filed Dec. 15, 1999, now abandoned entitled Disposable Kitty Litter Box, and which is incorporated herein by reference.

STATEMENT REGARDING FEDERALLY SPONSORED RESEARCH OR DEVELOPMENT

Not Applicable

BACKGROUND OF THE INVENTION

This invention relates to kitty litter boxes, and in particular, to disposable kitty litter boxes.

Kitty litter boxes, as is known, are filled with absorbent material. Although there are numerous types of absorbent material designed to deal with the odor of used kitty litter, eventually, the used kitty litter must be disposed of. There are numerous types of kitty litter boxes designed to facilitate disposal of the kitty litter. The easiest to use is the disposable kitty litter box. Such boxes contain kitty litter, and, when it is time to dispose of the kitty litter, the box and the absorbent material within the box are all disposed of. An example of a prior disposable kitty litter box is shown in U.S. Pat. No. 5,251,573 to Bremley, which is incorporated herein by reference.

Litter boxes, such as the box shown in the above-noted patent work extremely well. A conventional kitty litter box is about 21"×13"×3". Generally commercial kitty litter boxes are available in packaging in substantially these dimensions. Because of this size, the boxes are typically arranged, in the store, flat with one box stacked upon the other. Due to the size, it is difficult for a store to have many of such kitty litter boxes out at a single time. Thus, the shelves must be restocked more often.

BRIEF SUMMARY OF THE INVENTION

The kitty litter box of the present invention is formed from a one-piece, unitary blank. It is provided as a closed box which opens to a full standard sized kitty litter box. After use, the opened kitty litter box can be closed to facilitate disposal of the box.

The dimensions of the kitty litter box when closed, are significantly smaller then the dimension of a standard, opened kitty litter box. Thus, the kitty litter boxes, when closed, can be stood on end in a store to form a row of boxes. Due to the relative dimensions of the closed kitty litter box, because the closed kitty litter boxes are arranged in rows on the store shelves rather than stacked, more closed kitty litter boxes than standard opened kitty litter boxes can be placed on the store shelves. Thus, when the kitty litter boxes of the present invention are used, the store can better maximize the use of the available shelf space.

The kitty litter box includes a first section, a second section, and an intermediate section. The first and second sections are identical in size and shape. Each has a panel, side walls extending up from side edges of the panels and end walls extending up from end edges of the panels. The intermediate section has a back panel and side walls extending up from side edges of the intermediate section panel. The first and second section panels are hingedly connected to the intermediate section panel; and the first and second side walls are hingedly connected to the intermediate section side walls. Thus, the side walls form a continuous wall from the end of the first section to the end of the second section.

To facilitate folding of the box from the opened position to the closed position, the intermediate section side walls include a fold line extending diagonally from a top of one edge of the intermediate section side wall to a bottom of another edge of the intermediate section side wall. Additionally, the second section side wall includes a first diagonal fold generally parallel to the intermediate section diagonal fold line and which extends from the fold line joining the second section and intermediate section side walls. The second section also has a second diagonal fold line extending upwardly from a forward edge of the side walls. The first and second diagonal fold lines divide the second section side walls into two end triangular sections and a trapezoidal section between the triangular sections. When the box is folded from its opened position to its closed position, the second section side walls fold inwardly along the diagonal fold lines so that the first section side walls can fit over the second section side walls.

When the kitty litter box is in the opened position, the panels of the first section, second section, and third section are substantially coplanar and define a bottom of the opened kitty litter box and the side walls of the first section, second section, and intermediate section, and the end walls form a continuous wall around the periphery of the panels of the opened kitty litter box. When the kitty litter box is in the closed position, the first section and second section panels define a front and back of the closed box, the intermediate section panel defines a bottom of the closed box, the first section side walls define side walls of the closed box, and the first section end wall defines a top wall of the closed box.

Handles are formed in the end walls of the kitty litter box. The handles include spaced apart legs and a cross-member extending between the legs. The handles have fold lines at distal ends of the legs where the legs join the end walls so that the handles can be moved between a first position in which the handles are coplanar with the end walls and a second position in which the handles are out of the plane of the end walls to facilitate carrying of the box. The handles define tabs on the end walls between the legs, and, when the handles are in the second, carrying, position, the slits defining the handle legs form channels in the end walls adjacent side edges of the tabs. When the kitty litter box is in the closed position, and the handles are in the second, carrying, position, the legs of the second section handle extend through the channels of the first section end wall and frictionally engage edges of the first section channel. Additionally, the tab of the first section end wall extends between the legs of the second section handle and frictionally engages inner edges of the second section handle legs.

In one variation of the kitty litter box, the second or forward set of diagonal lines of the side walls are eliminated and diagonal fold lines are added to the end panels. The end panel fold lines extend from the bottom corners of the end panels upwardly and diagonally towards an upper edge of the end panels. The diagonal fold lines are angled such that said side walls can be folded inwardly to lie flat against the first, second, and intermediate section panels.

In another embodiment, the end walls are two-ply end walls, each comprising an inner panel and an outer panel. Fold tabs are provided at the ends of the first and second section side walls which are sandwiched between the inner and outer panels of the end walls. The end wall inner panels frictionally engage the respective first and second section panels to allow the box to be formed without glue. The free ends of the end wall inner panels can be provided with at least one tab. The tabs increase the frictional engagement between the inner panels of the first and second end walls and said first and second panels, respectively. If desired, debossments can be provided with the first and second section panels which engage the end wall inner panel tabs.

The kitty litter box is provided with kitty litter (which preferably is contained within a closed bag inside the closed box). When the box is closed and standing on its bottom (the intermediate section panel), the kitty litter is at the bottom of the box.

The weight of the kitty litter and the frictional engagement of the handles and end walls maintain the kitty litter box in its closed position such that the kitty litter box need not be wrapped or taped to maintain the box closed.

The kitty litter box can also be provided with a disposal bag sized to accept the kitty litter box in either a folded or partially folded condition to dispose of the kitty litter box after use.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

Figure 1:
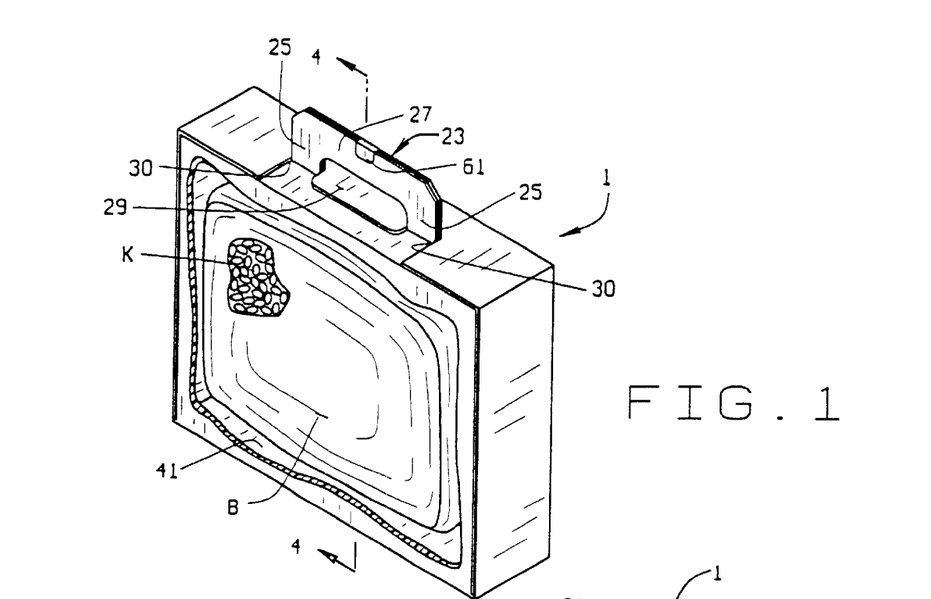
FIG. 1 is a perspective view of a kitty litter box of the present invention, in a closed position, partially cut-away to show a bag of kitty litter contained therein.
Figure 5:
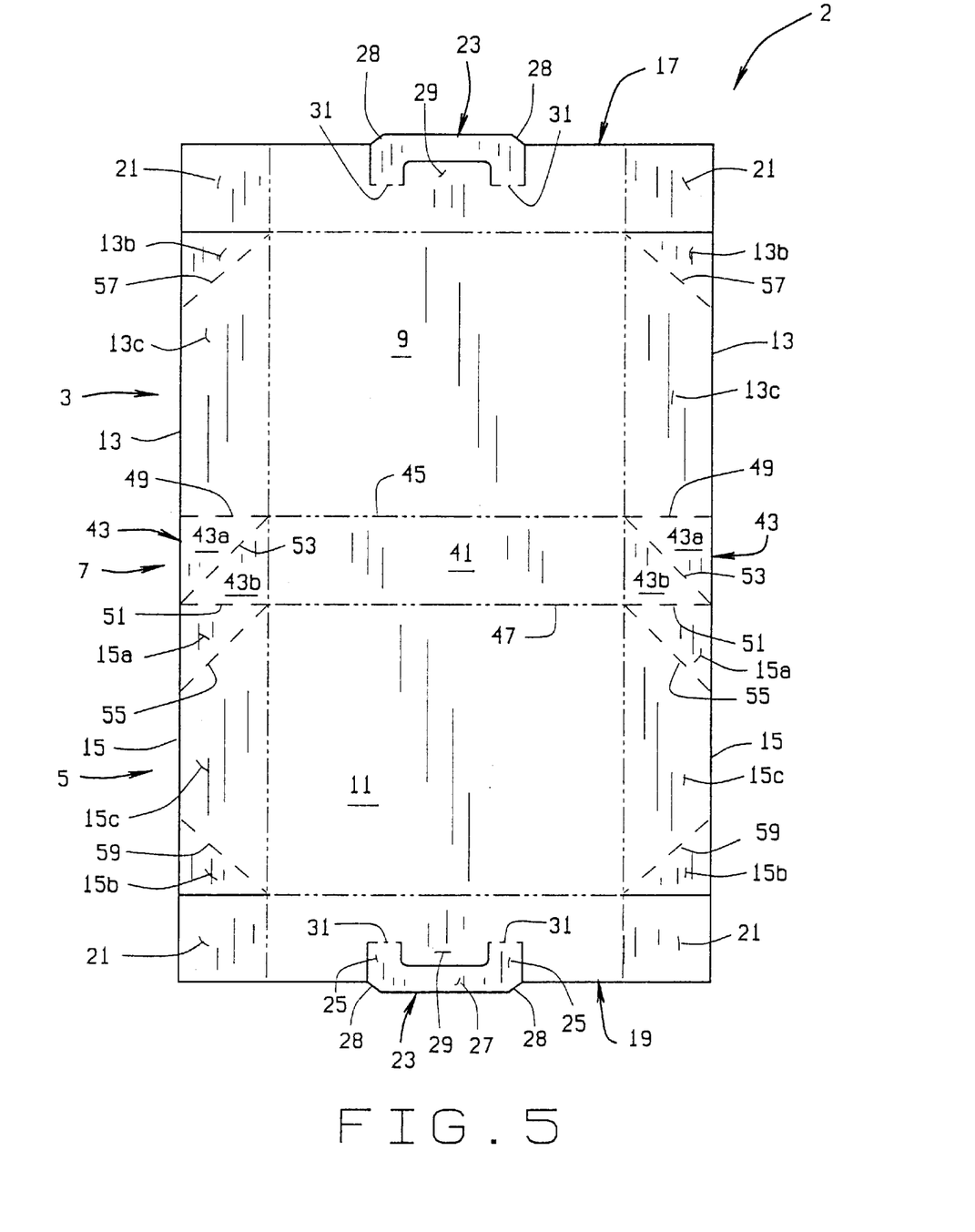
FIG. 5 is a plan view of a one-piece blank from which the kitty litter box is made.

A kitty litter box 1 of the present invention is made from a one-piece unitary blank 2. (FIG. 5) The kitty litter box is provided to the customer in a folded-up, closed position, as seen in FIG. 1, with a bag B of kitty litter K contained therein. As will be described below, when the customer is ready to use the kitty litter box, he need merely open up the closed box in the same manner that a brief case, for example, is opened up. The closed kitty litter box unfolds to a box which, preferably, is at least as large as a standard kitty litter box. After the kitty litter has been used, the customer can simply fold up the kitty litter box to either partially or fully close the box. The box of used kitty litter can then be placed in a garbage bag G which is supplied with the box and disposed of. The box 1 is preferably made of paperboard, and its inner surfaces of the box 1 are preferably covered with a liquid impervious coating.

Turning to the Figures, the kitty litter box 1 has a first section 3 and a second section 5 which are joined by an intermediate section 7. The first and second sections 3 and 5 are identical and have panels 9 and 11, side walls 13 and 15 extending up from side edges of the respective panels, and end walls 17 and 19 extending up from end edges of the respective panels. The end walls 17 and 19 each include glue tabs 21 at opposite ends thereof to allow the end walls to be connected to the side walls. The glue tabs 21 are hingedly connected to the side walls by fold lines, so that they can be folded over to be glued to adjacent end walls.

Figure 2:
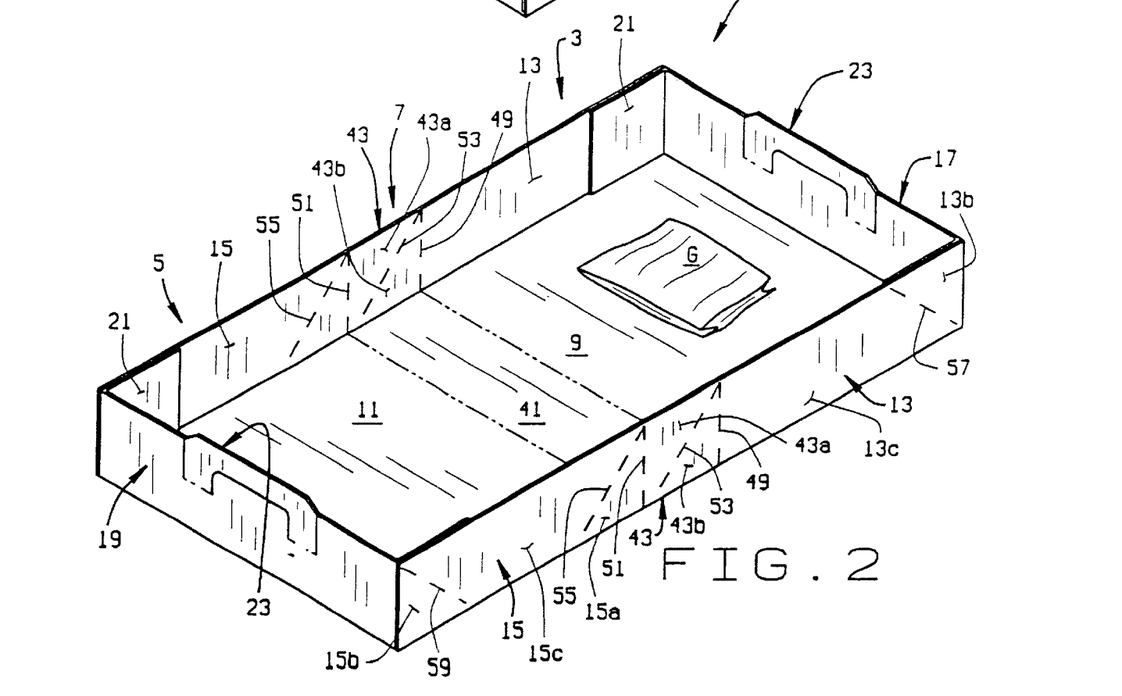
FIG. 2 is a perspective view of the kitty litter box in an opened position.
Figure 3:
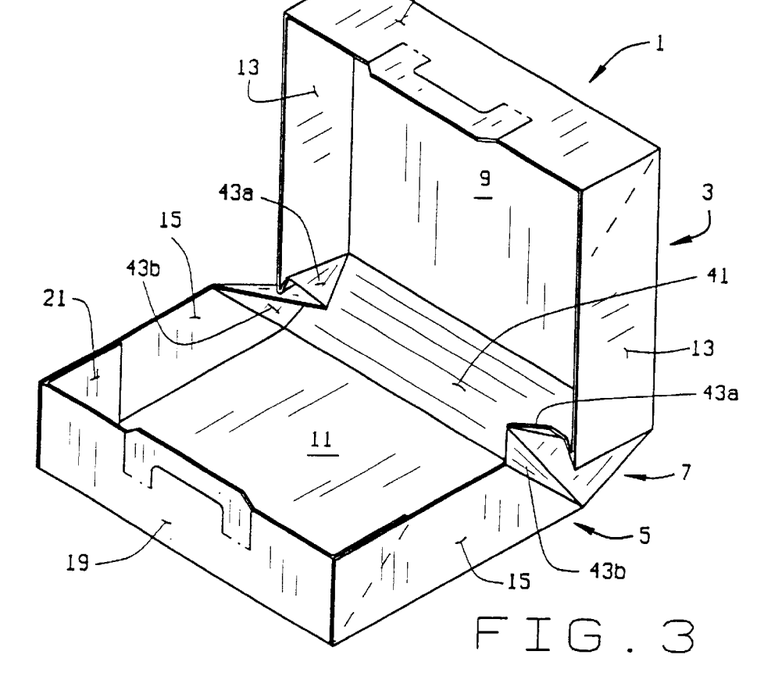
FIG. 3 is a perspective view of the kitty litter box in a partially closed position.

The end walls 17 and 19 each also have a generally C-shaped handle 23. The handles 23 have side legs 25 joined by a cross-member 27. The corners 28 of the handles are preferably beveled to eliminate sharp corners. As seen in FIG. 2, the top edges of the handles 23 extend above the top edges of the end walls 17 and 19. The handles could be formed so that the top edge of the cross-members 27 are flush with the top edge of the end walls. If formed in this manner, the corners could define 900 angles, rather than being beveled, as shown in the Figures. The side edges of the side legs 25 and the bottom edge of the cross-member 27 are defined by slits in the end walls, and the handles 23 thus form tabs 29 on the end walls 17 and 19. Additionally, the bottom edges of the side legs are defined by a fold lines 31 to hingedly connect the handles 23 to the end walls. When the kitty litter box 1 is closed, as seen in FIG. 1, the handles 23 extend up from the box to enable the box to be carried by the customer. When the handles extend up, the spaces left by the legs 25 define channels 30 in the end wall.

The intermediate section 7 of the kitty litter box includes a panel 41 and side walls 43 which extend up from the side edges of the panel 41. The panels 9 and 11 of the first and second sections are hingedly connected to the intermediate section panel 41 by fold lines 45 and 47. Additionally, the side walls 13 and 15 of the first and second sections are hingedly connected to the intermediate section side walls 43 by fold lines 49 and 51. The fold lines 45, 47, 49, and 51 extend generally perpendicularly to the side edges of the intermediate section panel 41 (and hence perpendicularly to the elongate side edges of the blank 2 from which the box 1 is formed). The fold lines 49 are colinear with the fold line 45; and the fold lines 51 are colinear with the fold line 47. When the kitty litter box 1 is in its closed position, the back panel 41 defines the bottom of the box, and the kitty litter box can sit upright on the store shelves, rather than laying flat, as do commercially available kitty litter boxes.

The intermediate section side walls 43 each include a diagonal fold line 53 extending from the top of fold line 49 to the bottom of fold line 51. The fold line 53 divides the side walls 43 into an upper section 43a and a lower section 43b. The second section side walls 15 each also have a diagonal fold line 55 which extends diagonally downwardly from the top of fold line 51 and which is generally parallel to the fold line 53. The fold lines 55 define triangular sections 15a adjacent the fold lines 51. Lastly, the first and second section side walls 17 and 19 each include fold lines 57 and 59 which extend diagonally upwardly from the bottom of the end edges of the side walls. The fold lines 57 and 59 form triangular sections 13b and 15b adjacent the end edges of the side walls 13 and 15. The triangular sections 15a,b of the side walls 15 are joined by a trapezoidal section 15c. Trapezoidal sections 13c of side walls 13 extends between the triangular sections 13b and the fold lines 49. The diagonal fold lines 53, 55, 57 and 59 all form angles of about 45° with the top and bottom edges of the side walls 13, 15, and 43. As described below, the diagonal fold lines all facilitate the closing of the kitty litter box, to both place the kitty litter box in its closed condition for sale to the consumer, and for the consumer to fold up the used kitty litter box for disposal.

As noted above, the kitty litter box 1 is sold in the closed position as shown in FIG. 1. The panels 9 and 11 of the first and second sections are each about 10½" tall by about 13" wide. The side walls 17, 19, and 43, as well as the intermediate section panel 41 are all about 3" tall. With a 10½" height to the back panels 9 and 11, the kitty litter box 1 will open up to a length of 24" (10½*2+3), which is longer than a standard kitty litter box. The height of the back panels 9 and 11 can be shortened, if desired, to provide for a shorter kitty litter box. A standard kitty litter box is about 21" long. To provide for a 21" long kitty litter box, the back panels 9 and 11 would each be about 9" tall. The kitty litter box 1, in its closed position, is about 10½"×13"×3". The dimensions can be altered as desired, to produce different sized kitty litter boxes. Because of the compact size of the box 1 when closed, the box 1 can sit upright on a store shelf, rather than laying flat as do commercially available kitty litter boxes. Because of the height and length of commercially available kitty litter boxes, the boxes must be laid flat on the store shelves. When laid flat, only a few boxes, i.e., 4–5, can be stacked on top of each other. However, the kitty litter boxes 1 can stand upright on the shelves when closed, and hence, can be placed back-to-back to form a row of 8–9 closed kitty litter boxes on the store shelves. As can be appreciated, this makes for much more efficient use of shelf space, especially considering that shelf space is at a premium in stores.

When the box 1 is closed, the first section 3 is closed over the second section 5; the box second section 5 is received in the box first section 3; and the end wall tab 23 of the first section passes over the end wall tab 23 of the second section and passes through the handle 23 of the second section. Because the handles 23 of the first and second sections are identical (and hence of the same size), the first section end wall tab 29 will frictionally engage the inner edges of the second section handle legs 25. Additionally, the second section handle legs 23 will frictionally engage the edges of the first section end wall channels 30. Thus, the handles and end walls will frictionally engage each other to facilitate maintaining the kitty litter box in its closed position. When the box is on the store shelf, the bag B of kitty litter K will sit on the bottom or intermediate panel 41, and the mere weight of the kitty litter will also help hold the box closed. Therefore, there is no need to provide for any tape, for example, from the first section side and/or end walls to the second section base panel to maintain the box closed. Although, such tape could be provided if desired. Additionally, because the kitty litter is contained in a bag, there is no need to shrink wrap or otherwise enclose the box 1.

A piece of tape 61 is preferably provided which holds the cross-members 27 of the two handles 23 together. This piece of tape is provided to hold the handles together to facilitate carrying of the box and to deter customers from opening the boxes in the store.

To open the box 1 for use, the tape 61 is sliced, or otherwise cut or removed from the handles 23, and the box 1 is simply opened so that the panels 9, 11, and 41 all lay generally flat. The bag B of kitty litter K is then opened, and the kitty litter is spread in the opened kitty litter box 1. Although the paperboard from which the box 1 is made has a memory, and will angle up slightly at the fold lines 45 and 47, the weight of the kitty litter K will overcome the "memory" of the paperboard, and maintain the opened kitty litter box in a flat position. Depending on the type of kitty litter used, the kitty litter box 1 is preferably provided with 4-8 lbs. of kitty litter. This is enough to completely cover the bottom of the opened kitty litter box. When the kitty litter box is opened, the handles 23 can be folded up (or in), as seen in FIG. 2, such that they are flush with the end walls 17 and 19.

When the kitty litter has been used, the kitty litter box can be folded up, and simply thrown away. To do so, the first section 3 is simply folded over the second section 5. As the kitty litter box is folded from its opened to its closed position, the loose kitty litter K in the box will slide from the first section toward the second section. As long as the box 1 is closed slowly, very little, if any, kitty litter should escape from the box as it is closed. The closed kitty litter box (or partially closed kitty litter box) then can be slid into a garbage bag and disposed of. Preferably, a disposal garbage bag is provided with the kitty litter box 1, as noted above. The garbage bag G can simply be removably adhered to the inner surface of one of the panels 9 or 11, and removed by the customer prior to spreading the kitty litter K in the opened kitty litter box 1.

Figure 4:
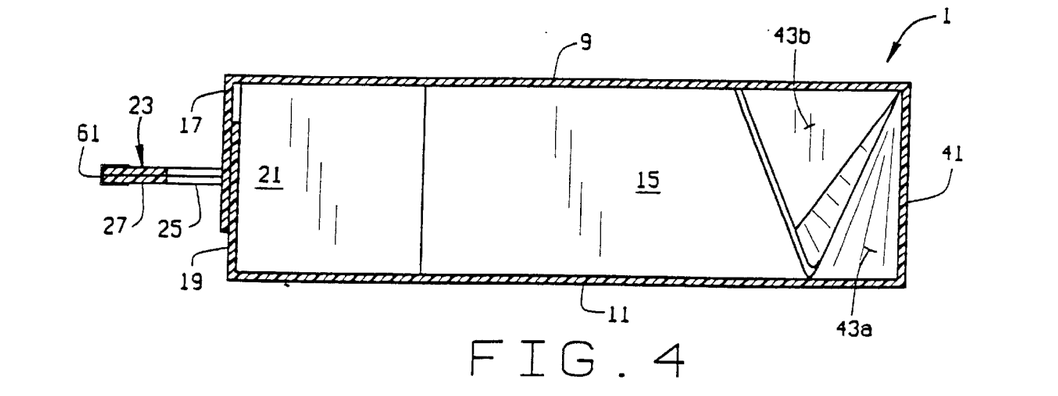
FIG. 4 is a cross-sectional view of the closed kitty litter box taken through line 4—4 of FIG. 1, with the bag of kitty litter removed for clarity.

As the box 1 is closed, the rear triangular sections 15a will fold inwardly along their diagonal fold lines 55. Additionally, the intermediate side walls 43 will fold along their diagonal fold lines 53. Thus, when the box is closed, the intermediate side wall section 43b will be adjacent the intermediate panel 41, the side wall section 43a will be adjacent the side wall section 43b, and the second section side wall section 19a will extend diagonally inside the box, as seen in FIG. 4. The second section side walls 15 will also fold inwardly along the forward fold line 59. The side walls 15 thus fold inwardly along the fold lines 55 and 59. This allows for the first section 3 (which is dimensionally the same size as the second section 5) to easily cover the second section 5.

Figure 6:
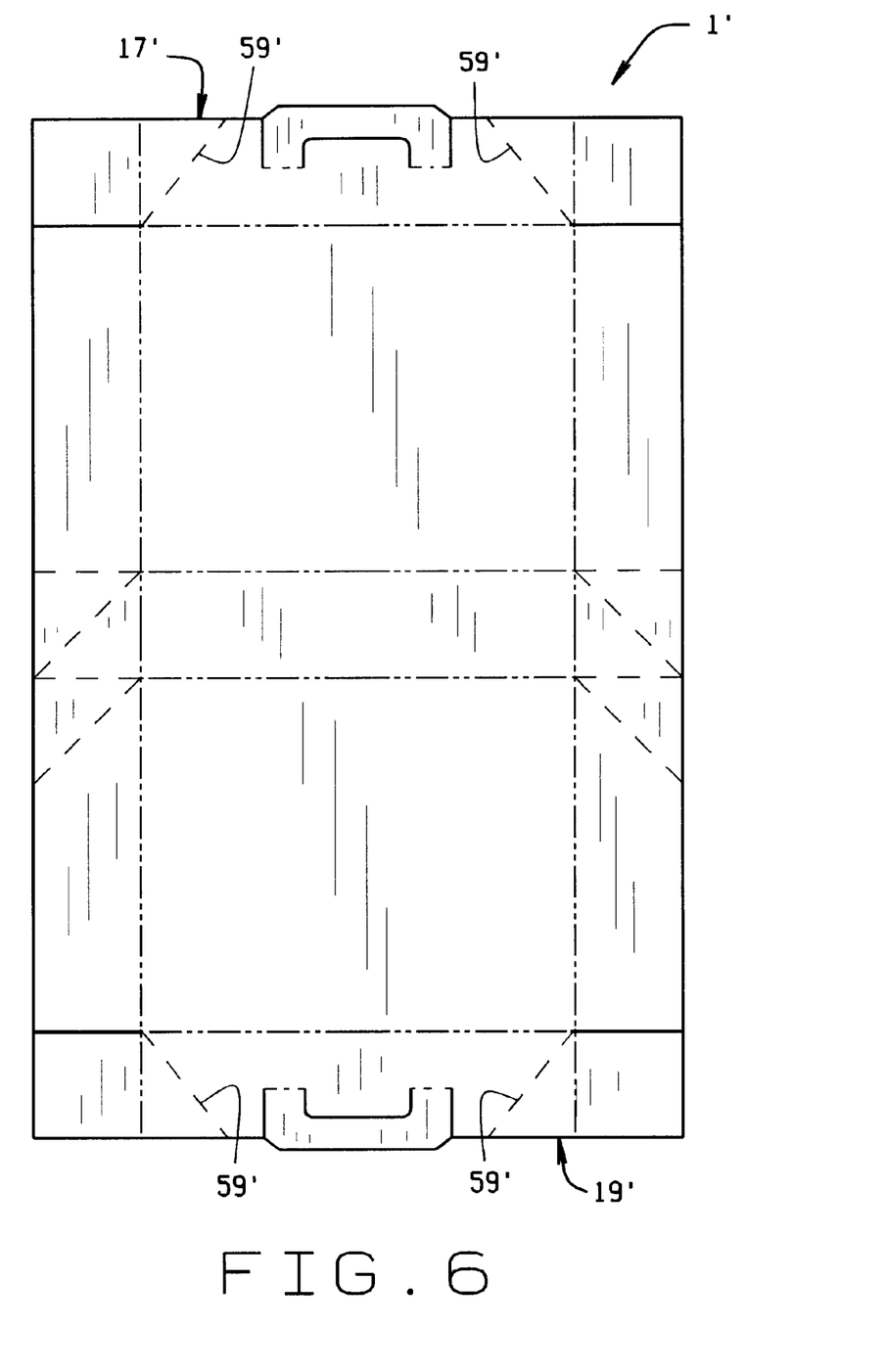
FIG. 6 is a plan view of an alternative one-piece blank from which the kitty litter box is made.
Figure 7:
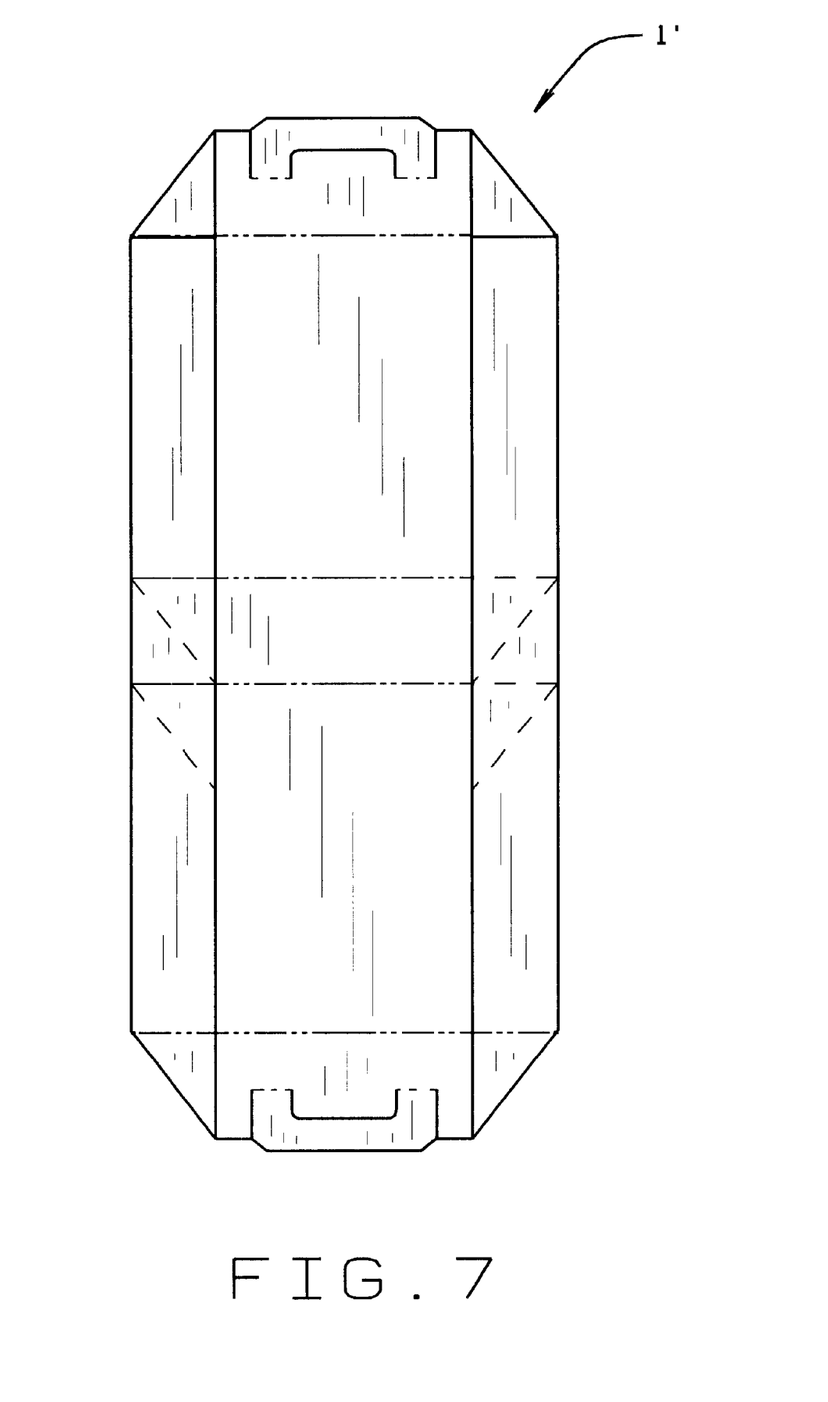
FIG. 7 is a plan view of a box formed from the blank of FIG. 6 and folded flat for shipping and/or storage.

An alternative blank 1' is shown in FIG. 6. The blank of FIG. 6 is substantially similar to the blank of FIG. 5. The difference between the blanks is that the blank 1' of FIG. 6 omits the fold lines 59 at the forward end of the side walls 13 and 15, and adds diagonal fold lines 59' on the end walls 17' and 19'. As seen in FIG. 7, by adding the fold lines 59' on the end walls of the box, once the box is formed, it can be folded flat by folding the side walls along their bases, so that the side walls lie against the bottom of the box. When the side walls are folded in this manner, the box end walls 17' and 19' will fold along the their fold lines 59' and along their bottom edges to extend outwardly from the box bottom to be substantially co-planar with the box bottom, as seen in FIG. 7. When the boxes are folded in this manner, they can be shipped in a substantially flat state after they have been formed. This allows for a much greater number of boxes to be shipped at a time. I have found that five times as many boxes formed from the blank 1' of FIG. 6 can be shipped in the same volume as the number of boxes formed from the blank 1 of FIG. 5.

Figure 8:
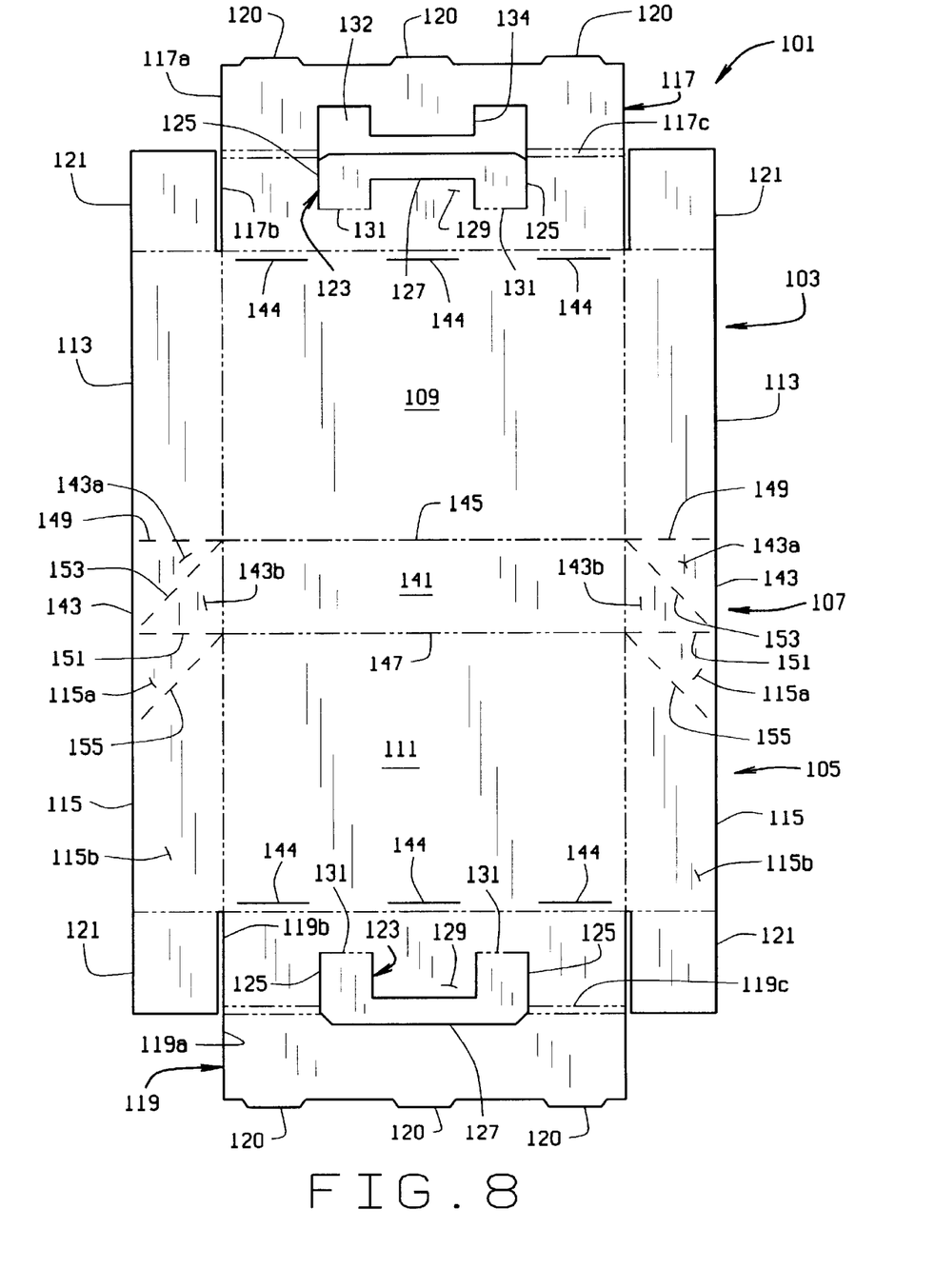
FIG. 8 is a plan view of a second alternative blank which allows for a kitty litter box to be formed without a gluing operation.

The blank 101 shown in FIG. 8 allows for a box to be formed without a gluing operation. Blank 101 includes a first section 103 and a second section 105 which are joined by an intermediate section 107. The first and second sections 103 and 105 are identical and have bottom panels 109 and 111, side walls 113 and 115 extending up from side edges of the respective panels, and double ply end walls 117 and 119 extending up from end edges of the respective panels. The end walls 117 and 119 each include an inner ply 117a and 119a and an outer ply 117b and 119b which are connected together along fold lines 117c and 119c. The end wall inner plies 117a and 119a each include short elongate tabs 120 at their free ends. The side walls 113 and 115 each include tabs 121 at their free ends adjacent the end walls 117 and 119 (when the blank is flat). The tabs 121 are hingedly connected to the side walls by fold lines, so that they can be folded over and sandwiched between the two plies of the end walls 117 and 11 9 when the box 101 is folded.

Figure 9:
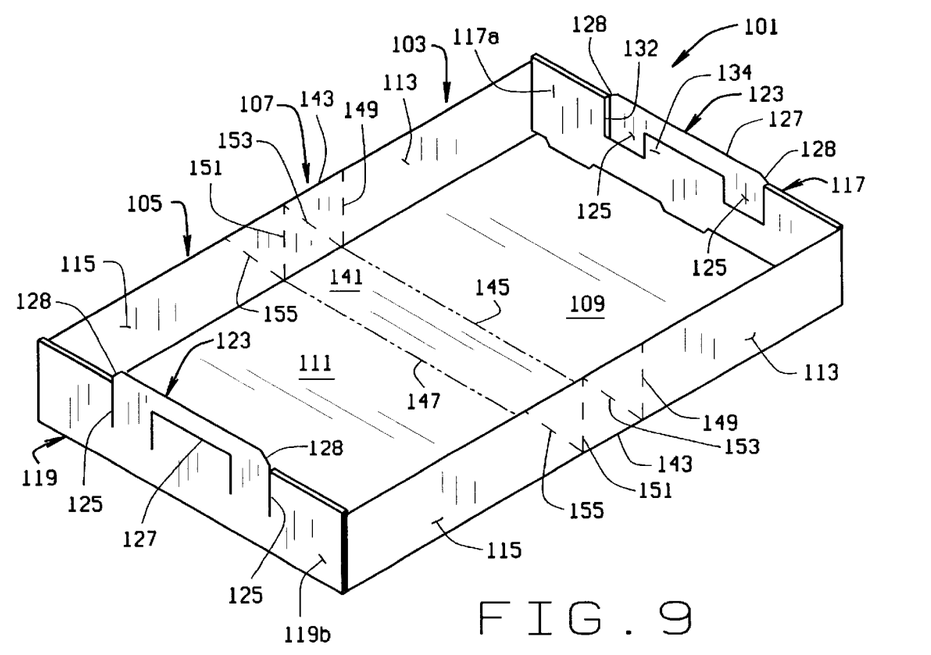
FIG. 9 is a perspective view of the box formed from the blank of FIG. 8.
Figure 11:
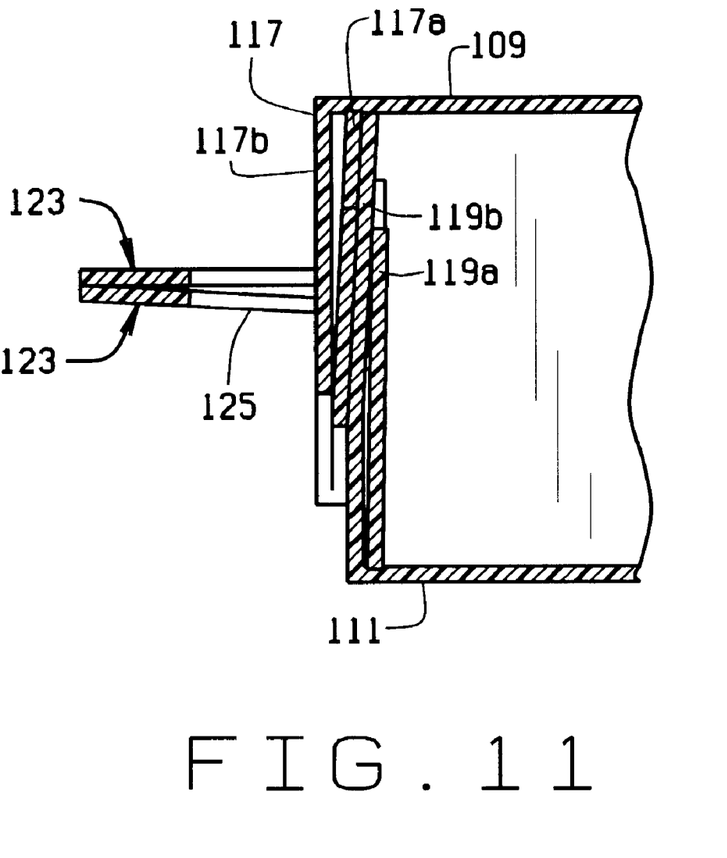
FIG. 11 is a fragmentary cross-sectional view similar to FIG. 10, but showing a second way of closing the kitty litter box.

The end walls 117 and 119 each include a generally C-shaped handle 123. The handles 123 have side legs 125 joined by a cross-member 127. The corners 128 of the handles are preferably beveled to eliminate sharp corners. As seen in FIG. 9, the top edges of the handles 123 extend above the top edges of the end walls 117 and 119. The handles could be formed so that the top edge of the cross-members 127 are flush with the top edge of the end walls. If formed in this manner, the corners would define 90° angles, rather than being beveled, as shown in the Figures. The side edges of the side legs 125 and the bottom edge of the cross-member 127 are defined by slits in the end wall outer panels 117b and 119b with the top corner of the legs 125 being approximately even with the fold lines 117c and 119c and the top edge of the cross-bar 127 extending slightly into the end wall inner panels 117a and 119a. The slices which define the inner edges of the legs and cross bar form tabs 129 on the end walls 117 and 119. The bottom edges of the side legs are defined by a fold lines 131 to hingedly connect the handles 123 to the end walls. Additionally, the end wall 117 includes a U-shaped channel 132 in the inner ply 117a. The channel 132 is aligned with the handle 123 in the outer ply 117b and is substantially a mirror image of the handle. The U-shaped channel 132 defines a second tab 134 which faces the tab 129 of panel 117a. When the kitty litter box 1 is closed, as seen in FIG. 11, the end wall 119 is received inside of the end wall 117. Thus the outer ply 119b of end wall 119 is adjacent the inner ply 117a of end wall 117. The channel 132 allows for the handle 123 of the end wall 119 to pass through the end wall 117, so that the two handles 123 can be adjacent each other to form a double ply handle. This will enable the box to be carried by the customer.

Figure 10:
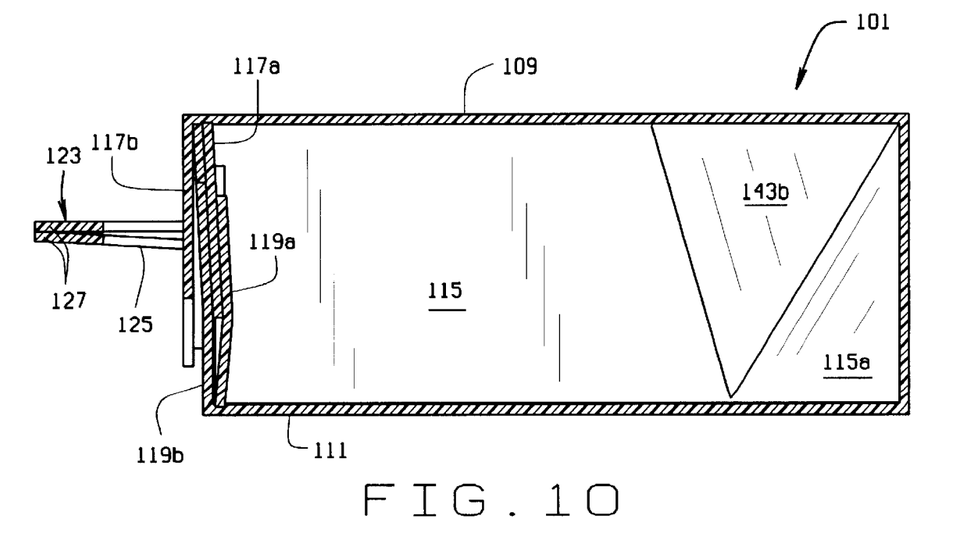
FIG. 10 is a cross-sectional view of the box of FIG. 9 when in a closed position.

The box can also be folded such that the end walls 117 and 119 mesh with each other in the area of the handles 123, as seen in FIG. 10. In this instance, inner panel 119a of the end panel 119, which is solid, defines an inner panel of the closed box. The tab 134 of the inner panel 117a then is received between the inner and outer panels 119a and 119b, respectively, of the end wall 119; and the tab 129 of the wall 119 is received between the inner ply 117a of end wall 117 and the tab 129 of the end wall 117. In this variation in the folding, the two handles 123 will still be adjacent each other to form a two-ply handle.

So that the cross-bars 127 of the two handles are level with each other when the box is closed, the legs 125 of the handle in the end wall 119 is slightly longer than the legs 125 of the handle in the end wall 117. This accounts for the fact that the legs in the handle of the end wall 119 must pass through both plies of the end wall 117.

The intermediate section 107 of the kitty litter box includes a panel 141 and side walls 143 which extend up from the side edges of the panel 141. The panels 109 and 111 of the first and second sections are hingedly connected to the intermediate section panel 141 by fold lines 145 and 147. Additionally, The side walls 113 and 115 of the first and second sections are hingedly connected to the intermediate section side walls 143 by fold lines 149 and 151. The fold lines 145, 147, 149, and 151 extend generally perpendicularly to the side edges of the intermediate section panel 141 (and hence perpendicularly to the elongate side edges of the blank 101 from which the box is formed). The fold lines 149 are colinear with the fold line 145; and the fold lines 151 are colinear with the fold line 147. When the kitty litter box 1 is in its closed position, the back panel 141 defines the bottom of the box, and the kitty litter box can sit upright on the store shelves, rather than laying flat, as do commercially available kitty litter boxes.

The intermediate section side walls 143 each include a diagonal fold line 153 extending from the top of fold line 151 to the bottom of fold line 149. The fold line 153 divides the side walls 143 into an upper section 143a and a lower section 143b. The second section side walls 115 each also have a diagonal fold line 155 which extends diagonally upwardly from the bottom of fold line 151 and which is generally parallel to the fold line 153. The fold lines 155 define triangular sections 115a adjacent the fold lines 151 and trapezoidal sections 115b between the fold lines 155 and the fold lines for the tabs 121. The diagonal fold lines 153 and 155 form angles of about 45° with the top and bottom edges of the side walls 113, 115, and 143. As described below, the diagonal fold lines all facilitate the closing of the kitty litter box, to both place the kitty litter box in its closed condition for sale to the consumer, and for the consumer to fold up the used kitty litter box for disposal.

To form the blank into a box, with the blank 101 lying flat, the side wall panels 113, 143, and 115 are folded along their hinge lines to be substantially perpendicular to the bottom panels 109, 141, and 111. The end tabs 121 at the ends of the side walls 113 and 115 are then folded inwardly. With the tabs 121 folded in, the end panels 117 and 119 are folded up along the hinge line between the end wall outer panels 117b, 119b and the bottom panels 109, 111. The end walls are then folded over the tabs 121 to bring the free ends of the end wall inner panels 117a and 119a into contact with the bottom panels 109 and 111. Thus, the tabs 121 are sandwiched between the inner and outer panels of the end walls 109 and 111. The tabs 120 on the free ends of the inner panels engage the bottom panels 109 and 111 to frictionally hold the inner panels 117a, 119a of the end walls 117 and 119 in place. The size of the tabs 120 are such that the frictional force between the bottom panels 109 and 111 and the end wall inner panels 117a, 119a will substantially prevent the end walls from inadvertently unfolding. If desired, the bottom panels 109 and 111 can be provided with detents or debossments 144 which receive the tabs 120.

Because the frictional engagement of the end wall inner panels and the bottom panels is so strong, no glue is needed to hold the box together. Thus, the box can be formed with a simple folding operation—a gluing operation is not required. This reduces the manufacturing costs of the box and allows for the box to be shipped to an assembly plant (where kitty litter, etc. will be added to the box) substantially flat. As can be appreciated, once the box 101 is formed, operation of the box 101 is substantially the same as described above for the box 1. Additionally, the two-ply end panel makes for a sturdier end panel and provides for a four-ply side when the box is folded for carrying.

As can be appreciated, the kitty litter box of the present invention is a box which not only allows for more efficient use of store shelf space, but which is also easy to use and is fully disposable.

As various changes could be made in the above constructions without departing from the scope of the invention, it is intended that all matter contained in the above description or shown in the accompanying drawings shall be interpreted as illustrative and not in a limiting sense.

What is claimed is:

1. A kitty litter box formed from a one-piece blank and is moveable between a closed position in which litter is contained within the closed box and an opened position, in which the litter is available for use by a cat; the kitty litter box comprising:
    a first section and a second section, said first and second sections being substantially identical in size and shape and each having a panel, side walls extending up from side edges of said panels and end walls extending up from end edges of said panels; and
    an intermediate section between said first and second sections; said intermediate section having a panel and side walls extending up from side edges of said intermediate section panel; said first and second section panels being hingedly connected to said intermediate section panel and said first and second side walls being hingedly connected to said intermediate section side walls;
    said intermediate section side walls including a fold line extending diagonally from a top of one edge of said intermediate section side wall to a bottom of another edge of said intermediate section side wall;
    said second section side walls including a diagonal fold line extending from the fold line joining said second section and intermediate section side walls; said fold line dividing said second section side walls into a triangular section adjacent said intermediate section side wall and a trapezoidal section;
    said end walls being two-ply end walls; said end walls each comprising an inner ply and an outer ply; said box including a fold tab at ends of said first and second section side walls; said end wall inner and outer plies sandwiching said fold tabs; said end wall inner plies frictionally engaging said respective first and second section panels to hold said box in a formed state without the use of glue;
    at least one tab at a free end of said end wall inner plies; said tab being sized to create said frictional engagement between said inner ply of said first and second end walls and said first and second panels, respectively;
    whereby; when said kitty litter box is in said opened position; said panels of said first section, second section, and intermediate section are substantially coplanar and define a bottom of the opened kitty litter box and said side walls of said first section, second section, and intermediate section, and said end walls form a continuous wall around said opened kitty litter box; and, when said kitty litter box is in said closed position, said first section and second section panels define a front and back of said closed box, said intermediate section panel defines a bottom of said closed box, said first section side walls define outer side walls of said closed box, and said first section end wall defines an outer top wall of said closed box.

2. The kitty litter box of claim 1 wherein said second section side walls include a second diagonal fold line extending upwardly from a forward edge of said side walls; said first and second diagonal fold lined dividing said second section side walls into two end triangular sections and a trapezoidal section between said triangular sections.

3. The kitty litter box of claim 1 wherein said end panels include opposing diagonal fold lines; said fold lines extending from bottom corners of said end panels upwardly and diagonally towards an upper edge of said end panels; said diagonal fold lines being angled such that said side walls can be folded inwardly to lie flat against said first, second, and intermediate section panels.

4. The kitty litter box of claim 1 including debossments on said first and second panels, said debossments being positioned to receive said inner ply tabs of said end wall inner ply.

5. The kitty litter box of claim 1 wherein said diagonal fold line of said second section side wall is generally parallel to said intermediate section diagonal fold line.

6. The kitty litter box of claim 1 including handles formed in, and integral with, said end walls; said handles including spaced apart legs, and a cross-member extending between said legs, said handles having fold lines at distal ends of said legs to be movable between a first position in which said handles are coplanar with said end walls and a second position in which said handles are out of the plane of said end walls; said handles defining tabs on said end walls in the space defined by inner edges of said handle legs and cross-member; wherein, when said handles are in said second position, slits defining said handle legs form channels in said end walls adjacent side edges of said tabs.

7. The kitty litter box of claim 6 wherein when said kitty litter box is in said closed position, and said handles are in said second position, the legs of the second section handle extend through the channels of the first section end wall and frictionally engage edges of the first section channel; and the tab of the first section end wall extends between the legs of the second section handle and frictionally engages inner edges of said second section handle legs.

8. The kitty litter box of claim 7 wherein the frictional engagement between said end walls and said handles maintains said kitty litter box in said closed position.

9. The kitty litter box of claim 7 wherein said box includes kitty litter; said kitty litter being at the bottom of said box when said box is in its closed position and sitting on the intermediate section panel.

10. The kitty litter box of claim 9 wherein the weight of the kitty litter and the frictional engagement of the handles and end walls maintain the kitty litter box in its closed position such that the kitty litter box need not be wrapped or taped to maintain the box closed.

11. The kitty litter box of claim 9 wherein the kitty litter is contained in a closed bag in the box.

12. The kitty litter box of claim 9 wherein the kitty litter box is provided with a disposal bag, the disposal bag being sized to accept the kitty litter box in either a closed or partially closed condition to dispose of the kitty litter box after use.

13. A kitty litter box formed from a one-piece blank and is moveable between a closed position in which litter is contained within the closed box and an opened position, in which the litter is available for use by a cat; the kitty litter box comprising:
    a first section, a second section, and an intermediate section; said first and second sections being substantially identical in size and shape and each having a panel, side walls extending up from side edges of said panels and end walls extending up from end edges of said panels; said intermediate section having a panel and side walls extending up from side edges of said intermediate section panel; said first and second section panels being hingedly connected to said intermediate section panel and said first and second side walls being hingedly connected to said intermediate section side walls; whereby, when said kitty litter box is in said opened position; said panels of said first section, second section, and intermediate section are substantially coplanar and define a bottom of the opened kitty litter box and said side walls of said first section, second section, and intermediate section, and said end walls form a continuous wall around said opened kitty litter box; and, when said kitty litter box is in said closed position, said first section and second section panels define a front and back of said closed box, said intermediate section panel defines a bottom of said closed box, said first section side walls define outer side walls of said closed box, and said first section end wall defines an outer top wall of said closed box; and handles formed in said end walls by slits which are made in said end walls; said handles including spaced apart legs, and a cross-member extending between said legs, said handles having fold lines at distal ends of said legs such that said handles are movable between a first position in which said handles are coplanar with said end walls and a second position in which said handles are out of the plane of said end walls; said handles defining tabs on said end walls in the space defined by inner edges of said handle legs and cross-member; wherein, when said handles are in said second position, said slits defining said handle legs form channels in said end walls adjacent side edges of said tabs; when said kitty litter box is in said closed position, and said handles are in said second position, the legs of the second section handle extend through the channels of the first section end wall and frictionally engage edges of the first section channel; and the tab of the first section end wall extends between the legs of the second section handle and frictionally engages inner edges of said second section handle legs, the frictional engagement between said end walls and said handles operating to maintain said kitty litter box in said closed position;

said end walls each consisting of an inner ply and an outer ply connected by a fold line, and said first and second section side walls including fold tabs sandwiched between said end wall inner and outer plies; said first and second section end wall inner plies frictionally engaging said first and second section panels, respectively, to hold said box in an assembled state without the use of glue;

said first section end panel including a generally U-shaped channel in alignment with said handle; said generally U-shaped channel being substantially equal in size and shape to said handle and being substantially a mirror image of said handle; wherein when said box is in its folded state, said end panels interengage each other such that said second section end wall outer ply is adjacent said first section end wall inner ply; and said second section handle, when folded outwardly, passes through said generally U-shaped channel of said first section inner ply to be adjacent said first section handle.

14. The kitty litter box of claim 13 wherein said intermediate section side walls include a fold line extending diagonally from a top of one edge of said intermediate section side wall to a bottom of another edge of said intermediate section side wall; and said second section side walls include a first diagonal fold line extending from the fold line joining said second section and intermediate section side walls; and a second diagonal fold line extending upwardly from a forward edge of said side walls; said first and second diagonal fold lines dividing said second section side walls into two end triangular sections and a trapezoidal section between said triangular sections.

15. The kitty litter box of claim 13 wherein said end walls each include opposing diagonal fold lines extending from lower corners of said end walls upwardly and diagonally to upper edges of said end walls; said end wall diagonal fold lines being angled to allow for said first, second, and intermediate section side walls to be fold ed substantially flat against said first, second, and intermediate section panels.

16. The kitty litter box of claim 13 including at least one tab at a free end of said end wall inner plies; said tab being sized to create said frictional engagement between said inner ply of said first and second end walls and said first and second panels, respectively.

17. The kitty litter box of claim 16 including debossments on said first and second panels, said debossments being positioned to receive said inner ply tabs of said end walls.

18. The kitty litter box of claim 13 wherein the legs of said second section handle are slightly longer than the legs of said first section handle, such that, when said box is placed in its folded state, the cross-members of said first and second section handles will be substantially aligned with each other.

19. The kitty litter box of claim 13 wherein said box includes kitty litter; said kitty litter being at the bottom of said box when said box is in its closed position and sitting on the intermediate section panel; the weight of the kitty litter further helping to maintain the kitty litter box in its closed position such that the kitty litter box need not be wrapped or taped to maintain the box closed.

20. The kitty litter box of claim 19 wherein the kitty litter is contained in a closed bag in the box.

21. A kitty litter box formed from a one-piece blank and is moveable between a closed position in which litter is contained within the closed box and an opened position, in which the litter is available for use by a cat; the kitty litter box comprising:

a first section and a second section, said first and second sections being substantially identical in size and shape and each having a panel, side walls extending up from side edges of said panels and end walls extending up from end edges of said panels; and an intermediate section between said first and second sections; said intermediate section having a panel and side walls extending up from side edges of said intermediate section panel; said first and second section panels being hingedly connected to said intermediate section panel and said first and second side walls being hingedly connected to said intermediate section side walls; the side walls of said intermediate section and said first and second sections being formed to allow said kitty litter box to be moved between its opened and closed positions;

said end walls being two-ply end walls; said end walls each comprising an inner ply and an outer ply; said box including a fold tab at ends of said first and second section side walls; said end wall inner and outer plies sandwiching said fold tabs; said end wall inner plies frictionally engaging said respective first and second section panels to hold said box in a formed state without the use of glue;

whereby; when said kitty litter box is in said opened position; said panels of said first section, second section, and intermediate section are substantially coplanar and define a bottom of the opened kitty litter box and said side walls of said first section, second section, and intermediate section, and said end walls form a continuous wall around said opened kitty litter box; and, when said kitty litter box is in said closed position, said first section and second section panels define a front and back of said closed box, said intermediate section panel defines a bottom of said closed box, said first section side walls define outer side walls of said closed box, and said first section end wall defines an outer top wall of said closed box.

* * * * *